Patented July 4, 1939

2,164,793

UNITED STATES PATENT OFFICE 2,164,793

POLYMETHINE DYESTUFFS

Carl Winter and Nikolaus Roh, Ludwigshafen-on-the-Rhine, Germany, assignors to General Aniline Works, Inc., New York, N. Y., a corporation of Delaware No Drawing. Application August 31, 1936, Serial No. 98,823. In Germany September 7, 1935

4 Claims. (Cl. 260—240)

The present invention relates to dyestuffs of the polymethine series.

We have found that new dyestuffs of the polymethine series distinguished by excellent tinctorial properties can be obtained by employing in the preparation of these dyestuffs nitriles of the general formula

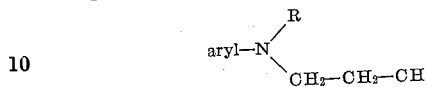

wherein R stands for hydrogen or an alkyl, hydroxyalkyl or aralkyl radicle, or their substitution or saponification products, nitrile groups present in the resulting dyestuffs being wholly or partly saponified if desired. The arylamino-beta-propionitriles serving as starting materials according to this invention may be prepared in accordance with the U. S. Patent No. 1,992,615 by adding primary or secondary aromatic amines to acrylic acid nitrile.

The dyestuffs may be prepared according to this invention for example by condensing the above mentioned nitriles or substitution or saponification products thereof with methylene-indoline-omega aldehydes or by condensing the said compounds which contain an aldehyde group attached to an aryl radicle with any compound containing reactive methylene groups. The resulting dyestuffs are distinguished by a good clarity and fastness of the dyeings. Their shade of color is considerably displaced towards red as compared with the corresponding dyestuffs without the propionitrile group.

According to our invention both water soluble and water insoluble dyestuffs may be obtained. Generally speaking the polymethine dyestuffs derived from an indoline are water soluble and most suitable for dyeing cotton mordanted with tannin or acetate artificial silk. When employing compounds containing reactive methylene groups such as cyanacetic acid esters or arylides, malonic acid dinitrile or aceto acetic acid arylides the resulting dyestuffs are water-insoluble and most suitable for dyeing acetate artificial silk.

The following examples will further illustrate how the said invention may be carried out in practice but the invention is not restricted to these examples. The parts are by weight.

Example 1

80 parts of 1,3,3-trimethyl-2-methyleneindoline-omega-aldehyde and 72 parts of N-ethyl-N-phenyl-beta-amino-propionitrile are dissolved in 90 parts of benzene. 63 parts of phosphorus oxychloride are allowed to flow in slowly at 20° C. while cooling. The mixture is heated to boiling for about an hour on a steam bath, introduced into 2000 parts of water and the benzene distilled off. The resulting dyestuff is deposited by the addition of common salt, separated from the acid liquid and obtained in the form of dark violet lustrous prisms by crystallization from hot water and filtration of the solution from resinous by-products. The product dyes cotton mordanted with tannin clear red shades. It corresponds to the formula

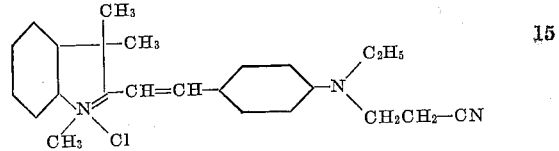

By saponifying the nitrile group by means of strong mineral acids, a dyestuff is obtained which dyes cotton mordanted with tannin more bluish shades.

Example 2

46 parts of 5-methoxy-1,3,3-trimethyl-2-methyleneindoline-omega-aldehyde and 35 parts of N-methyl-N-phenyl-beta-amino-propionitrile are dissolved in 40 parts of benzene and 31 parts of phosphorus oxychloride are slowly added at 20° C. After heating for an hour at 80° C. the melt is introduced into 500 parts of water, neutralized with 50 parts of 35 per cent caustic soda solution and the benzene expelled. The dyestuff is deposited from the solution by salting out and is crystallized from water to free it from resinous by-products. The resulting dyestuff dyes cotton mordanted with tannin clear bluish red shades. It corresponds to the formula

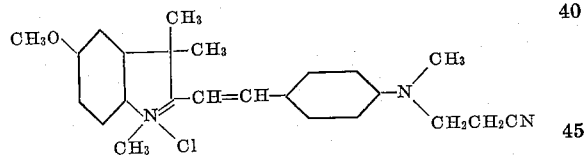

The same dyestuff is also obtained by condensing the N-methyl-N-beta-propionitrile-para-aminobenzaldehyde having a boiling point of from 220° to 222° C. at a pressure of 3 millimetres (mercury gauge) (obtainable from N-methyl-N-phenyl-beta-amino-propionitrile by treatment with methyl-formanilide and phosphorus oxychloride) (see Berichte der Deutschen Chemischen Gesellschaft 60, page 119) with 5-methoxy - 1,3,3 - trimethyl - 2 - methyleneindoline by means of glacial acetic acid.

Example 3

23.1 parts of 5-methoxy-1,3,3-trimethyl-2-methylene-indoline-omega-aldehyde and 23.6 parts of N-benzyl-N-phenyl-beta-aminopropionitrile are dissolved in 50 parts of benzene and condensed with 15.5 parts of phosphorus oxychloride in the manner described in Example 2. A dyestuff is obtained which dyes cotton mordanted with tannin bluish red shades. It corresponds to the formula

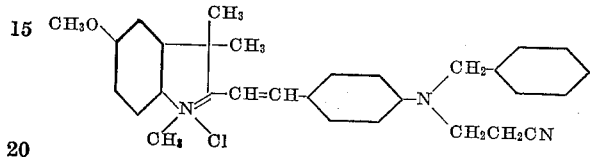

Example 4

18.8 parts of N-methyl-N-beta-propionitrile-para-amino-benzaldehyde (see Example 2) and 11.3 parts of cyanoacetic acid ethyl ester are dissolved in 50 parts of ethyl alcohol; 0.5 parts of piperidine is added and the whole heated to boiling for about one quarter of an hour. The solution becomes intense yellow in color. The condensation product formed crystallizes in the cold giving yellow crystals. It dyes acetate artificial silk clear green-yellow shades. The dyestuff corresponds to the formula

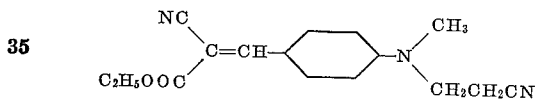

If 20.2 parts of N-ethyl-N-beta-propionitrile-para-aminobenzaldehyde (boiling point from 205° to 207° C. at a pressure of 1 millimetre (mercury gauge)) be employed instead of 18.8 parts of N-methyl-N-beta-propionitrile-para-amino-benzaldehyde, a dyestuff is obtained which dyes acetate artificial silk more reddish shades. It corresponds to the formula

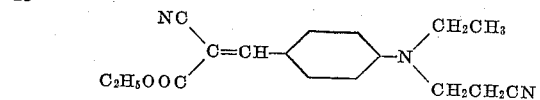

What we claim is:

1. Polymethine dyestuffs corresponding to the general formula

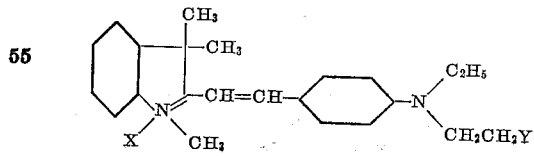

wherein X stands for the radicle of a mineral acid, and wherein Y stands for a member of the group comprising CN and its saponification products.

2. Polymethine dyestuffs corresponding to the general formula

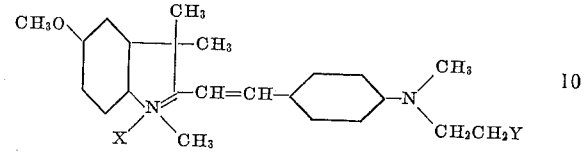

wherein X stands for the radicle of a mineral acid, and wherein Y stands for a member of the group comprising CN and its saponification products.

3. Polymethine dyestuffs corresponding to the general formula

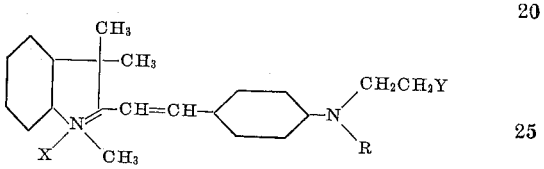

wherein X stands for the radicle of a mineral acid, wherein R stands for a member of the group consisting of hydrogen, alkyl and benzyl, and wherein Y stands for a member of the group comprising C—N and its saponification products.

4. Polymethine dyestuffs corresponding to the general formula

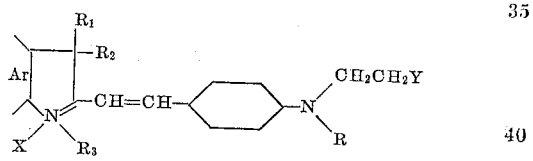

wherein

stands for a phenylene nucleus, wherein $R_1$, $R_2$ and $R_3$ stand for alkyl, wherein X stands for the radicle of a mineral acid, wherein R stands for a member of the group consisting of hydrogen, alkyl and benzyl, and wherein Y stands for a member of the group comprising $C \equiv N$ and its saponification products.

CARL WINTER.
NIKOLAUS ROH.

CERTIFICATE OF CORRECTION.

Patent No. 2,164,793.                                 July 4, 1939.

CARL WINTER, ET AL.

It is hereby certified that error appears in the printed specification of the above numbered patent requiring correction as follows: Page 1, first column, line 10, in the formula, for "CH" at the end thereof read --CN--; and that the said Letters Patent should be read with this correction therein that the same may conform to the record of the case in the Patent Office.

Signed and sealed this 13th day of January, A. D. 1942.

(Seal)                                                Henry Van Arsdale,
Acting Commissioner of Patents.